United States Patent
Jassy et al.

(10) Patent No.: US 7,287,042 B1
(45) Date of Patent: Oct. 23, 2007

(54) SEARCH ENGINE SYSTEM SUPPORTING INCLUSION OF UNFORMATTED SEARCH STRING AFTER DOMAIN NAME PORTION OF URL

(75) Inventors: Andrew R. Jassy, Seattle, WA (US); Udi Manber, Palo Alto, CA (US); Jonathan Leblang, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 473 days.

(21) Appl. No.: 10/924,521

(22) Filed: Aug. 23, 2004

Related U.S. Application Data

(63) Continuation of application No. 10/792,405, filed on Mar. 3, 2004, now abandoned.

(51) Int. Cl.
*G06F 7/06* (2006.01)

(52) U.S. Cl. .................................. 707/104.1

(58) Field of Classification Search ................ 707/1–4, 707/10, 100, 102, 104.1; 709/203, 217, 218, 709/219
See application file for complete search history.

(56) References Cited

U.S. PATENT DOCUMENTS

| | | | | |
|---|---|---|---|---|
| 6,173,406 B1 * | 1/2001 | Wang et al. | ................... | 726/3 |
| 6,321,251 B1 * | 11/2001 | Deisinger et al. | ........... | 709/203 |
| 6,625,594 B1 | 9/2003 | Rolland et al. | ................. | 707/3 |
| 6,643,641 B1 * | 11/2003 | Snyder | ......................... | 707/4 |
| 6,760,746 B1 * | 7/2004 | Schneider | ................... | 709/203 |
| 6,772,150 B1 * | 8/2004 | Whitman et al. | .............. | 707/6 |
| 6,895,430 B1 * | 5/2005 | Schneider | ................... | 709/217 |
| 7,058,626 B1 * | 6/2006 | Pan et al. | ...................... | 707/4 |

OTHER PUBLICATIONS

Internet.com article titled "*With1Click, Who Needs Yahoo or AOL Keywords?*," by Michael Singer, dated Feb. 8, 2001.
Press release titled "*Protogent Inc. Unveils With1Click.com Beta Search Directory Version . . . 2.0,*" dated Sep. 1, 2002.
Description in Background section of present application.

\* cited by examiner

*Primary Examiner*—Chong H Kim
(74) *Attorney, Agent, or Firm*—Knobbe, Martens, Olson & Bear, LLP

(57) ABSTRACT

A web site system provides functionality for searching a repository of information, such as the World Wide Web, by including a search string at the end of a URL without any special formatting. In one embodiment, when the system receives a request for a URL of the form www.domain-_name/char_string, where char_string is a character string that may include spaces and non-alphabetic characters, the system initially determines whether the character string includes a prefix that identifies the URL as a non-search-request URL. If no such prefix is present, the character string is used in its entirely as a search string to execute a search, and the results of the search are returned to the user.

30 Claims, 2 Drawing Sheets

SEARCH ENGINE SYSTEM SUPPORTING INCLUSION OF UNFORMATTED SEARCH STRING AFTER DOMAIN NAME PORTION OF URL

This application is a continuation of U.S. patent application Ser. No. 10/792,405, filed Mar. 3, 2004 now abandoned, the disclosure of which is hereby incorporated by reference.

BACKGROUND OF THE INVENTION

1. Field of the Invention

The present invention relates to user interfaces and methods for submitting search queries to web-based search engines.

2. Description of the Related Art

Numerous web sites exist that provide search engines for allowing users to conduct searches of the World Wide Web and other repositories of content. Typically, a user conducts a search by retrieving a search page of a web site, entering a search string into a search box, and then selecting a button for submitting the search string as a search query or request. The search string may be a search phrase in which individual terms are separated by spaces, or may consist of a single search term. The results of the search query are provided to the user on one or more search results pages.

Some search engine sites support the ability for a user to submit a search query by encoding the search string within a URL (Uniform Resource Locator). Typically, however, the user must encode the search string in the URL using special formatting that is inconvenient or unnatural for users to type. For example, in some cases, users must add a special string such as "query=" to indicate that a search is being requested, and/or must add special characters to the search string itself. As one example, the URL www.google.com/search?q=mars%20rover may be used to the search for "mars rover."

SUMMARY OF THE INVENTION

The present invention addresses this and other problems by providing a web site system that includes functionality for searching a repository of information, such as the World Wide Web, by including a search string at the end of a URL without any special formatting. The search string may consist of a single search term, or a plurality of search terms separated by spaces. For example, a user wishing to search for "San Francisco Hotels" may do by simply accessing the URL www.domain_name/San Francisco Hotels, where domain_name is a domain name associated with the web site system. The system may also support the use of Boolean operators and/or other types of operators within the search strings.

In one embodiment, when the system receives a request for a URL of the form www.domain_name/char_string, where char_string is a character string that may include spaces and non-alphabetic characters, the system initially determines whether the character string includes a prefix that identifies the URL as a non-search-request URL. If no such prefix is present, the character string is used in its entirety as a search string to execute a search, and the results of the search are returned to the user. Otherwise, the URL request is processed as a non-search-request URL by, for example, retrieving a static web page or other object from a subdirectory.

Neither this summary nor the following detailed description purports to define the invention. The invention is defined by the claims.

DETAILED DESCRIPTION OF THE PREFERRED EMBODIMENTS

Specific embodiments of the invention will now be described with reference to the drawings. These embodiments are intended to illustrate, and not limit, the invention. The scope of the invention is defined by the claims.

Figure 1:
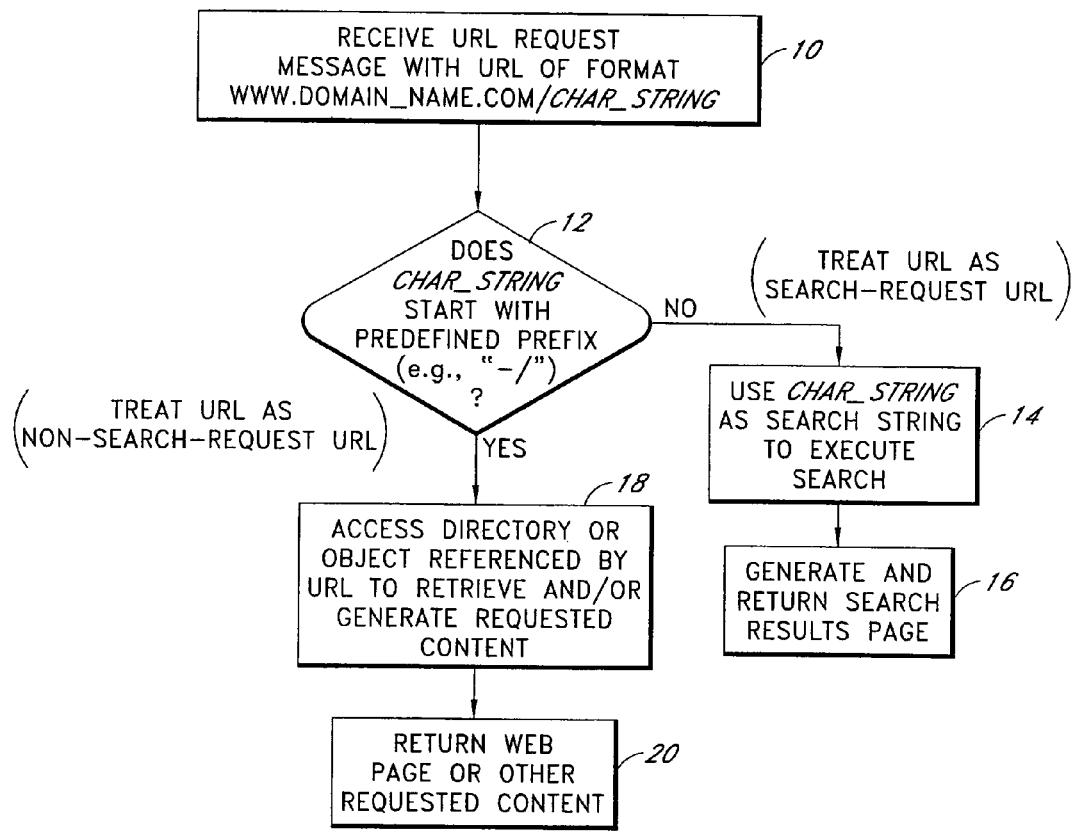
FIG. 1 illustrates a method for processing URL requests in accordance with one embodiment of the invention.

FIG. 1 illustrates a method by which URL request messages from users are processed in a preferred embodiment of the invention. As described below, the method depicted in FIG. 1 may be implemented within software that runs on one or more servers that process request messages from web clients.

As depicted by block 10, a URL request message, such as an HTTP message of the form GET URL, is initially received from user/web client. The URL included in this request message is of the form www.domain_name/char_string, where domain_name is a domain name of a web site system to which the requested is directed (e.g., "a9.com"), "/" is a separator character, and char_string is a character string that may or may not be a search string. The character string may include spaces, slashes, hyphens, and other types of non-alphabetic characters. Although a forward slash is used in this embodiment, a different separator character, such as a question mark, may alternatively be used.

As depicted by block 12, the URL is initially processed by determining whether char_string starts with a predefined prefix, such as the two-character prefix "-/", that is used to distinguish search request URLs from non-search-request URLs. The prefix may have any desired length, such as one, two, three, or four characters. A prefix that is not likely to appear within search strings submitted by users is preferably used.

As depicted by block 14, if char_string does not start with the predefined prefix, char_string is treated in its entirely as a search string for performing a search. For example, if the URL is www.a9.com/San Francisco Hotels, the string "San Francisco Hotels" would be used as a search string (and more specifically, a keyword phrase) for performing a search. In a preferred embodiment, the searches are executed as web searches to locate web pages and other types of documents on the World Wide Web. In other embodiments, the searches may additionally or alternatively be directed to another type of content repository, such as, for example, a database of published literature, a database or electronic catalog of products, or a database of online auctions. As depicted by block 16, the results of the search are incorporated into a search results page, which is returned to the user/web client that submitted the request.

Although not depicted in FIG. 1, a user may also perform a search by submitting a search string from a conventional search page, which may be retrieved by requesting a URL of the form www.domain_name or www.domain_name/.

If char_string starts with the predefined prefix, the URL is treated as a non-search-request URL. In this scenario (shown in block 18), char_string is treated as a further reference to a directory or object in this scenario, and not as a search string. For example, if a prefix of "-/" is used, the URL www.a9.com/-/index.htm would be treated as a request for the web page at this address, while the URL www.a9.com/ index.htm would be treated as a request to search the World Wide Web for "index.htm." Although only a single prefix is needed, two or more different prefixes (e.g., both "-/" and "/-") may be recognized by the system as signifying the user's intent not to use char_string as search string. The web page or other object referenced by the non-search-request URL is returned to the user/web client in block 20.

An important benefit of the method shown in FIG. 1 is that users can add their search strings to the web site's base URL without the addition of any special characters to indicate an intent to conduct a search. For instance, a user wishing to search the web for "NFL scores" can just request the URL "www.a9.com/NFL scores". Another benefit is that users can use spaces to separate search terms, as is currently the convention for entering search strings on Internet search pages. An additional benefit is that the search string may appear at the very end of the URL.

As will be recognized, various modifications can be made to the method shown in FIG. 1. One such modification is to treat all URLs of the format www.domain_name/char_string as search request URLs. If this approach is used, a subdomain (e.g., www.pages.a9.com) may be provided for accessing other content of the web site. Another variation is to treat certain URLs that lack the full prefix as search requests if such URLs are otherwise invalid. For example, assuming "-/" is used as the only valid prefix, a request for www.a9.com//text may be treated as a request to search for "text" if the URL does not point to a valid subdirectory or object.

Another variation is to use a suffix, rather than a prefix, to identify non-search-request URLs. For instance, a URL of the format www.domain_name/char_string may be treated as a non-search-request URL if and only if char_string ends with a predefined suffix such as "/-" or "/-/".

Figure 2:
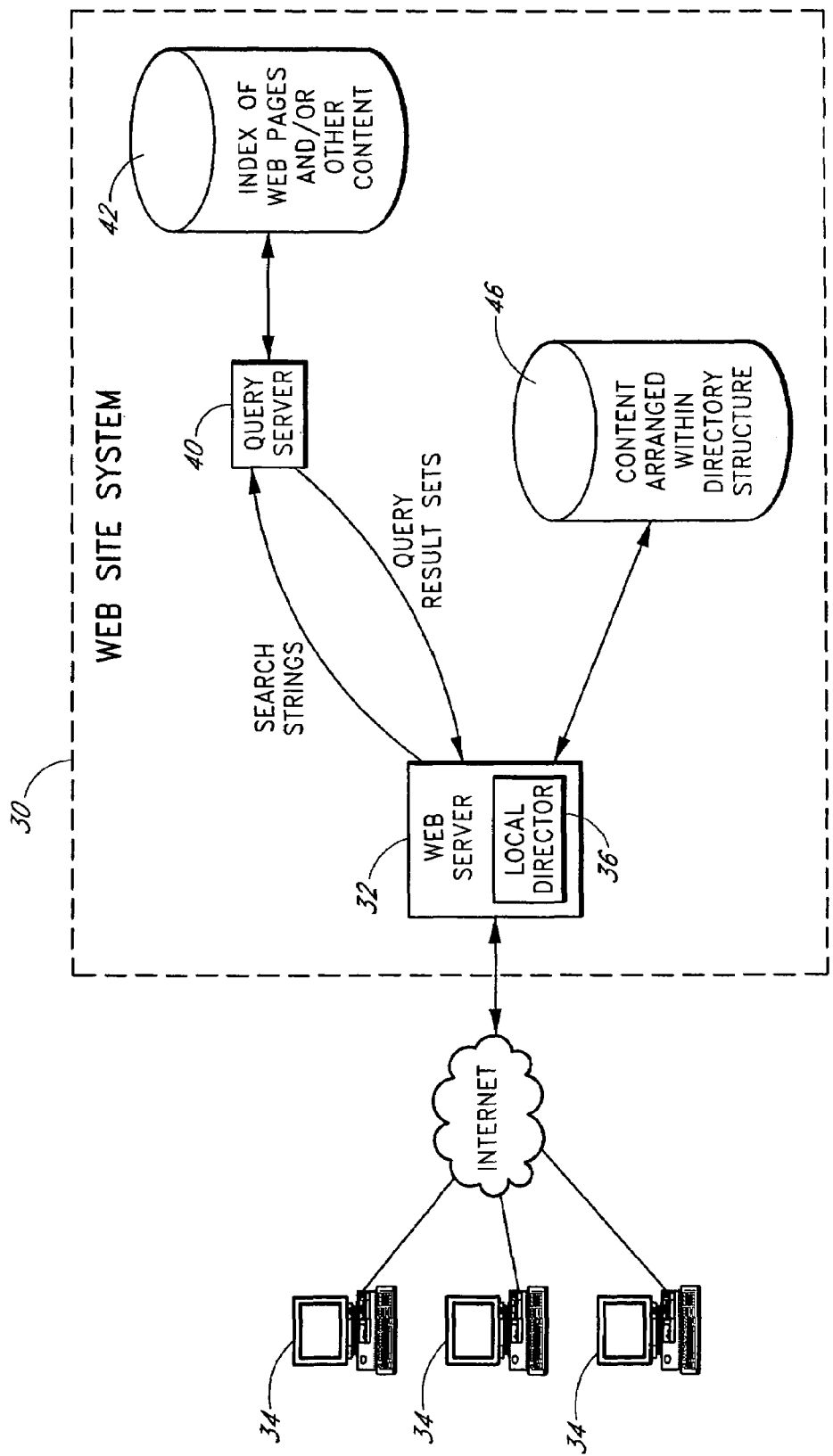
FIG. 2 illustrates one example of a set of components that may be used to implement the invention.

FIG. 2 illustrates components of a web site system 30 in which the invention may be embodied. The system includes a web server 32 that processes request messages received over the Internet from user computing devices 34, each of which runs a web browser or other web client program. The user computing devices 34 may include, for example, personal computers (PCs), personal digital assistants (PDAs), cellular telephones, and other types of devices that support web browsing.

The web server 32 includes, or runs in conjunction with, a local director component 36 that is responsible for decoding URL requests as depicted in FIG. 1 to evaluate whether each such request should be treated as a search request. In one embodiment, the local director 36 operates by analyzing each URL request according to a set of rules, and by passing URLs or URL parameters to specific physical servers or services based on the results of this analysis.

When a search request URL is received (e.g., www.a9.com/char_string, where char_string does not start with the predefined prefix), the web server/local director passes the URL, or the search string portion of the URL, to a query server 40 for processing. The query server 40 applies the search string to an index of web pages and/or other content 42 to execute the search request. In one embodiment, this task is performed by treating each term in the search string, except for noise words such as "and," "a," and "the," as a keyword. In another embodiment, the search string may include one or more groups of words (which may be demarcated using quotations), and may include Boolean operators (e.g., AND, OR and NOT) and/or other operators (e.g., +, −, parenthesis, and NEAR); if no quotations or operators are present, each term, excluding any noise words, may be treated as a keyword. The results of the search are returned to the web server 32, which incorporates some or all of the matching items into a search results page.

When a non-search-request URL is received, such as the URL www.a9.com/-/jobs.htm, the web server/local director preferably uses the URL to access a repository 46 in which content is arranged within a directory structure. This may involve passing the URL to a separate server or service responsible for retrieving or generating the content, depending upon the type of content being requested (e.g., static versus dynamic web page).

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims.

What is claimed is:

1. A method of processing URL request messages from user computing devices, the method comprising:
   receiving a URL request from a user computing device, the URL request specifying a URL that includes a domain name, followed immediately by a forward slash, followed immediately by a character string;
   determining whether the character string includes a predefined prefix that identifies the URL as a non-search-request URL, wherein a non-search-request URL is a URL in which the character string is not a search string for executing a search;
   when the character string includes a predefined prefix that identifies the URL as a non-search-request URL, retrieving content referenced by the URL, and returning the content to the user computing device in response to the URL request; and
   when the character string does not include a predefined prefix that identifies the URL as a non-search-request URL, executing a search in which the character string is used in its entirety as a search string, and returning results of the search to the user computing device in response to the URL request.

2. The method of claim 1, wherein executing the search comprises using each term within the character string, other than predefined noise words, as a keyword.

3. The method of claim 1, wherein executing the search comprises treating a space within the character string as a search term separator.

4. The method of claim 1, wherein determining whether the character string includes a predefined prefix comprises checking for each of a plurality of predefined prefixes used to identify non-search-request URLs.

5. The method of claim 1, wherein the step of retrieving content referenced by the URL comprises retrieving a static web page referenced by the URL.

6. The method of claim 1, wherein the URL ends with the character string.

7. A web site system that processes at least some URL request messages from user computing devices according to the method of claim 1.

8. A web site system that provides functionality for users to include search strings within URL requests, the system comprising:
   a query server that processes search strings from users to identify responsive items within a database; and
   a web server system coupled to the query server to enable users to submit search requests from web clients, wherein the web server system is responsive to at least some URL requests that include a domain name of the web server system, followed immediately by a forward slash, followed immediately by a character string that may include spaces, by causing the query server to execute a search in which the character string is used in its entirety as a search string to search the database of items;

whereby the web site system enables a user to search for search string by accessing a URL of the form www.domain_name/search_string, where domain_name is a domain name of the web server system and search_string is a search string that is permitted to include spaces.

9. The system of claim 8, wherein the web server system is responsive to a URL request of the form www.domain_name/char_string by determining whether char_string includes a predefined prefix that identifies the URL request as not being a request to execute a keyword search.

10. The system of claim 9, wherein determining whether char_string includes a predefined prefix comprises determining whether char_string starts with a predefined sequence of non-alphabetic characters.

11. The system of claim 8, wherein the query server uses each term within a multiple-term search string, other than predefined noise words, as a keyword.

12. The system of claim 8, wherein the search string need not include any operators.

13. The system of claim 8, wherein the search string may consist of one or more keywords.

14. A method of processing URL requests, comprising:
receiving a request message from a user computing device, the request message specifying a URL that includes a domain name, followed immediately by a single separator character, followed immediately by a character string that terminates the URL, wherein the character string consists of either a single search term or a plurality of search terms separated by spaces;
in response to the request message, executing a search in which the character string is used in its entirety as a search string, to thereby identify a set of items that are responsive to the search string; and
generating, and returning to the user computing device, a search results page that lists responsive items from said set.

15. The method of claim 14, wherein the character string consists of a single search term.

16. The method of claim 14, wherein the character string consists of a single keyword.

17. The method of claim 14, wherein the character string consists of a plurality of search terms separated by spaces.

18. The method of claim 14, wherein the search is executed in response to determining that the character string does not include a predefined character sequence.

19. The method of claim 18, wherein the predefined character sequence consists of a predefined sequence of two non-alphabetic characters.

20. The method of claim 14, wherein the search is executed in response to determining that the character string does not include a predefined prefix.

21. The method of claim 14, wherein the separator character is a forward slash.

22. A web site system configured to process at least some request messages from user computing devices according to the method of claim 14.

23. The method of claim 1, wherein executing the search comprises executing a World Wide Web search.

24. The method of claim 1, wherein the method comprises using a predefined prefix that consists of non-alphabetic characters.

25. The method of claim 1, wherein the method comprises using a predefined prefix having no more than two characters.

26. A computer-implemented method of providing access to content, the method comprising:
receiving a first uniform resource locator at a web site system, said first uniform resource locator comprising a character string that is separate from a domain name portion, and further comprising a prefix that identifies the character string as a non-search string;
responding to the first uniform resource locator by returning an object referenced by the first uniform resource locator such that the character string is used to locate the object in a directory structure;
receiving a second uniform resource locator at the web site system, said second uniform resource locator lacking said prefix, and comprising a search string that is separate from a domain name portion; and
responding to the second uniform resource locator by using the search string to execute a keyword search, and by returning a search results page containing results of the keyword search.

27. The method of claim 26, wherein the second uniform resource locator comprises a domain name, followed immediately by a forward slash, followed immediately by said search string.

28. The method of claim 26, wherein the search string is an unformatted search string and is included in the second uniform resource locator immediately after a forward slash that separates the unformatted search string from a domain name.

29. The method of claim 26, wherein the prefix consists of non-alphabetic characters.

30. The method of claim 26, wherein the method comprises using the character string as a file name of said object.

* * * * *

UNITED STATES PATENT AND TRADEMARK OFFICE
CERTIFICATE OF CORRECTION

| | | |
|---|---|---|
| PATENT NO. | : 7,287,042 B1 | Page 1 of 1 |
| APPLICATION NO. | : 10/924521 | |
| DATED | : October 23, 2007 | |
| INVENTOR(S) | : Jassy et al. | |

It is certified that error appears in the above-identified patent and that said Letters Patent is hereby corrected as shown below:

At column 5, line 9, replace "search string" with --search_string--.

The hyphens at the end of lines 9, 11 and 15 of column 5 do not form part of the claim language, but rather denote that a claim term has been divided across multiple lines.

Signed and Sealed this

Sixth Day of May, 2008

JON W. DUDAS
*Director of the United States Patent and Trademark Office*